(12) United States Patent
Purucker (10) Patent No.: US 11,933,362 B2
(45) Date of Patent: Mar. 19, 2024

(54) METHOD AND DEVICE FOR REPLACING A USED BEARING, IN PARTICULAR FOR REPLACING A MAIN BEARING OF A WIND TURBINE, AND BEARING ARRANGEMENT IN PARTICULAR OF A WIND TURBINE

(71) Applicant: EOLOTEC GMBH, Nuremberg (DE)

(72) Inventor: Michael Purucker, Baiersdorf (DE)

(73) Assignee: Sivantos Pte. Ltd., Singapore (SG)

( * ) Notice: Subject to any disclaimer, the term of this patent is extended or adjusted under 35 U.S.C. 154(b) by 173 days.

(21) Appl. No.: 17/433,056

(22) PCT Filed: Feb. 20, 2020

(86) PCT No.: PCT/EP2020/054532
§ 371 (c)(1),
(2) Date: Aug. 23, 2021

(87) PCT Pub. No.: WO2020/169762
PCT Pub. Date: Aug. 27, 2020

(65) Prior Publication Data
US 2022/0154773 A1    May 19, 2022

(30) Foreign Application Priority Data
Feb. 22, 2019  (DE) .................. 10 2019 202 449.1

(51) Int. Cl.
*F16C 35/063*  (2006.01)
*F16C 23/08*  (2006.01)
*F16C 33/60*  (2006.01)

(52) U.S. Cl.
CPC .......... *F16C 35/063* (2013.01); *F16C 23/086* (2013.01); *F16C 33/60* (2013.01);
(Continued)

(58) Field of Classification Search
CPC .............. F05B 2230/80; F05B 2230/70; F16C 2237/00; F16C 35/062; F16C 35/063
See application file for complete search history.

(56) References Cited

U.S. PATENT DOCUMENTS

| 7,759,815 B2 | 7/2010 | Christensen |
| 2015/0096174 A1* | 4/2015 | Lohan .................. F03D 80/50 29/889.1 |

FOREIGN PATENT DOCUMENTS

| DE | 202004020317 U1 | 5/2005 |
| DE | 102004058905 A1 | 6/2006 |

(Continued)

OTHER PUBLICATIONS

Written Opinion of the International Searching Authority for PCT/EP2020/054532 (Year: 2020).*

*Primary Examiner* — Christopher J Besler
(74) *Attorney, Agent, or Firm* — Laurence A. Greenberg; Werner H. Stemer; Ralph E. Locher (57) ABSTRACT

For replacing in particular a used main bearing of a wind turbine, a bearing housing is first pulled axially off the main bearing along a rotor shaft, then the used main bearing is divided and disassembled. A new main bearing is assembled around the rotor shaft and the original bearing housing is pushed axially back onto the main bearing. During the replacement of the main bearing, the rotor shaft is supported on a machine carrier by means of a holding device, wherein the holding device is arranged at least partially in the region between a bearing seat and a hub-side end region of the rotor shaft.

12 Claims, 4 Drawing Sheets

(52) U.S. Cl.
CPC ....... *F05B 2230/80* (2013.01); *F16C 2226/14* (2013.01); *F16C 2237/00* (2013.01); *F16C 2360/31* (2013.01)

(56) References Cited

FOREIGN PATENT DOCUMENTS

| | | |
|---|---|---|
| DE | 102009032174 A1 | 1/2010 |
| DE | 102014209399 A1 | 11/2015 |
| EP | 1426639 A1 | 6/2004 |
| EP | 3333439 A1 | 6/2018 |

* cited by examiner

METHOD AND DEVICE FOR REPLACING A USED BEARING, IN PARTICULAR FOR REPLACING A MAIN BEARING OF A WIND TURBINE, AND BEARING ARRANGEMENT IN PARTICULAR OF A WIND TURBINE

FIELD AND BACKGROUND OF THE INVENTION

The invention relates to a method as well as a device for replacing a used bearing with a new bearing, in particular for replacing a large bearing, such as the main bearing of a wind turbine. The invention further relates to a bearing arrangement of a wind power plant.

In the present context, large bearings are generally understood to mean bearings designed for high load capacities, for example of several tons, and typically having a diameter >0.5 m and preferably up to about 1 m.

In recent years, wind power has experienced a rapid development with numerous technological leaps in terms of performance and turbine design. Due to ever shorter development cycles, existing concepts have often merely been scaled up for the next power class. In the area of the drive train, the rotor bearing, i.e. the bearing of a rotor shaft, is particularly affected by scaling. The most common rotor bearing is the so-called three-point bearing, which was already widely used in small turbines <500 kW. The three-point bearing is characterized by very low rolling bearing costs and simple assembly. The roller bearing of the transmission, in particular of the first transmission stage, represents the second rotor bearing and transmits the wind loads via the torque supports of the transmission into the machine frame. A disadvantage of this rotor bearing solution is the strong influence by reaction forces and deformations on the transmission, which are introduced via the rotor bearing. Additionally, geometric conditions inherent in the design of spherical roller bearings lead to unfavorable load distribution and bearing kinematics, which in turn leads to premature damage in the rotor bearing. Especially with the increasing scaling of this solution for larger power classes, an increasing frequency of bearing damage can be observed.

Furthermore, there are rotor bearing concepts such as the so-called "disintegrated bearing arrangement", where instead of the second bearing arrangement in the first transmission stage, two spherical roller bearings or a double row tapered roller bearing with an additional cylindrical roller bearing are used. Even with these bearing designs, premature damage can occur due to geometric conditions, unfavorable load distribution and bearing kinematics.

If a damaged rotor bearing of a three-point bearing or a disintegrated bearing has to be replaced, this is associated with a very high financial and time expenditure according to the current state of the art. Since the integration of the second bearing in the transmission does not permit a simple disassembly of the bearing on the wind turbine, the rotor shaft including the entire transmission has to be disassembled. For this purpose, the entire rotor star has to be disassembled. In this context, rotor star is understood to mean the so-called rotor hub with the rotor blades. The rotor hub is fastened to the end of the rotor shaft. The rotor bearing including the transmission is then disassembled in a protected environment (production hall). After disassembly, the new rotor bearing is reconnected to the transmission and transported back to the wind turbine. During this repair process, a crane is positioned at the wind turbine, unless a second pre-assembled rotor bearing-transmission unit is available as part of a ring exchange.

With the disintegrated bearing, the transmission can often remain on the nacelle, and only the rotor shaft with the rotor star has to be disassembled. However, against the background of the increasing use in offshore applications, this is also very costly. For disassembly, an appropriate maintenance ship incl. crane is required, which leads to considerable costs and technical risks.

The bearing is generally arranged in a so-called bearing housing, which in turn is fastened to a machine carrier. To simplify initial assembly, it is known from DE 10 2004 058 905 A1 that the bearing housing is designed as a divided bearing housing, wherein a lower housing part is first arranged and then the bearing is assembled with a plurality of outer ring segments before finally an upper housing part is placed on the lower housing part. The lower housing part and upper housing part each have a radially projecting flange via which they are connected to one another.

From DE 10 2014 209 399 A1 furthermore can be found a one-piece bearing housing, which has an adjustable longitudinal gap on one side. This allows the bearing housing to be slightly widened for the replacement of a spherical roller bearing. For this purpose, the spherical roller bearing is pushed out of the bearing housing in the axial direction and then, due to a segmentation of the spherical roller bearing, it can be removed from the rotor shaft.

From EP 3 333 439 A1, the replacement of a used bearing, in particular of a wind turbine, can be seen without disassembly of the rotor. For this purpose, the used bearing as well as the used bearing housing are first divided and removed from the rotor shaft and then replaced by a new bearing divided in circumferential direction as well as a new bearing housing divided in circumferential direction.

SUMMARY OF THE INVENTION

Based on this, the invention is based on the task of enabling a further simplified replacement of a used bearing, in particular a large bearing, such as the main bearing of a wind turbine. In particular, the replacement is to be carried out cost-effectively without disassembly of the rotor shaft and the rotor star. That means that, during the replacement, the rotor shaft remains in the mounting position it occupies during operation. At most, the rotor shaft is lifted slightly.

The task is solved according to the invention by a method for replacing a used bearing by a new bearing as claimed, by a bearing arrangement as claimed as well as by a device as claimed. Preferred embodiments and further developments are contained in the subclaims. The advantages and preferred embodiments cited with respect to the method are also to be applied analogously to the bearing arrangement as well as the device.

For the replacement, according to the invention and according to a first aspect as a decisive difference compared to EP 3 333 439 A1, it is provided that the used bearing housing is retained and reused for the new bearing. Accordingly, it is provided that the used bearing housing is merely displaced axially relative to the used bearing and thus removed therefrom. The bearing housing is thereby either pulled off or pressed off the used bearing. The used bearing is then divided and removed from the rotor shaft before being replaced by a new bearing divided in the circumferential direction and received in the used, previous bearing housing.

If the used bearing is an already divided bearing, it can be removed non-destructively. In a preferred alternative, the bearing can be destroyed by cut-off welding, blasting, sawing, wire eroding, etc., especially in the case of a non-separated bearing, especially in the case of a non-divided bearing.

For assembly and disassembly, a holding device is provided designed in particular as a crossbeam, which is temporarily fastened to a fixed carrier, in particular a so-called machine carrier, and holds the rotor unit during replacement. The rotor unit, for short also referred to as the rotor, includes in particular the rotor shaft, a rotor hub and other components which are in particular firmly (directly or indirectly) connected to the rotor shaft. The rotor unit also includes in particular the so-called rotor star. A so-called rotor lock disk is also part of the rotor unit.

According to a second, independently inventive aspect, this holding device supports the rotor unit, in particular the rotor shaft between the rotor hub/rotor star and the bearing/bearing seat for the bearing, as claimed. In general, the support, i.e. the introduction of the forces into the holding device, takes place in the axial direction (viewed in the direction of the rotor hub) after the bearing seat. Thus, the acting (weight) forces are better supported and the load for the holding device is kept low. The holding device is therefore at least temporarily connected to the rotor unit for taking over the forces in the region between the bearing seat and the rotor hub. The combination of features of the claims without the features relating to the first aspect, i.e. without the features according to which the bearing housing is removed from the used bearing and according to which the new bearing is again arranged in the bearing housing, is therefore regarded as an independent invention. Preferred further developments thereto are formed by the subclaims, i.e. the features contained in the subclaims are each also combinable with this second aspect.

The crossbeam itself is generally fastened to a stationary part, in particular to the machine carrier. The fastening to the fixed part is preferably also behind the bearing seat in the axial direction, but can also be in front of it.

This second aspect is preferably combined with the exchange concept of the first aspect.

Alternatively, the crossbeam arrangement according to the invention is combined with a known exchange concept, in particular according to EP 3 333 439 A1.

For replacing the used bearing according to the first aspect, in particular for replacing a used large bearing, especially for replacing a main bearing of a wind turbine, the following steps are performed thereby:

During operation, the used bearing is arranged on a bearing seat and supports a rotor shaft of a rotor unit, wherein the rotor shaft extends along an axis of rotation and in an axial direction towards a front end on the hub side, i.e. towards a rotor hub. The rotor shaft is typically connected with its rear end to a transmission and is preferably mounted in said transmission, in particular in a first transmission stage. The used bearing is arranged in a bearing housing, which is fastened to a machine carrier.

The replacement of the used bearing takes place without disassembling the rotor shaft, i.e. during replacement it remains in the installation position it occupies during operation. At most, it is moved slightly, for example by a few cm, in particular lifted.

For replacement, the bearing housing is pulled off or pressed off the used bearing in the direction of the axis of rotation and preferably against the axial direction, i.e. to the rear.

The used bearing thus made accessible is divided and removed from the rotor shaft.

The new bearing is fitted around the rotor shaft, wherein the new bearing is divided into a plurality of bearing ring segments in the circumferential direction. The new bearing is arranged again in the (old) bearing housing. At the end of the replacement, the new bearing is located at the intended bearing seat inside the old bearing housing.

In a preferred embodiment, the bearing housing is a one-piece, non-divided bearing housing. Said bearing housing therefore fully encloses the bearing by 360°, i.e. has a one-piece, in particular monolithic, annular region, in which the bearing is arranged during operation. Non-divided bearing housing is understood to mean a bearing housing, which cannot be divided without being destroyed. The bearing housing further typically has two radially projecting fastening flanges arranged opposite each other. With said fastening flanges, the bearing housing rests on the machine carrier, in particular on edge support regions of the machine carrier. The machine carrier is usually of half-shell design—at least in the region of the bearing—with the bearing and the bearing housing being immersed inside the shell-like recess. Half-shell-like is generally understood to mean a design in which the machine carrier, viewed in cross section, has a recess in a central region which is bounded laterally by the edge support regions. The cross-sectional contour of the machine carrier can be rectangular (U-shaped) or also curved at least in some regions. The contour, i.e. for example the radius, of the half-shell-like recess of the machine carrier is thereby adapted in some variants to the typically part-circular outer contour of the bearing housing. At least the width of the recess in the machine carrier is adapted to the plunging part of the bearing housing, in particular to the outer diameter of the annular part of the bearing housing. This means that the width corresponds to the outside diameter except for necessary installation tolerances.

In an expedient further development, the bearing housing is axially displaced by means of an (auxiliary) device in order to remove the bearing housing from the old bearing. Said device is in particular a press off or pull of device, by means of which the bearing housing is displaced in the direction of the axis of rotation. Thus, in general, an axial pressing-off or pushing-off takes place. The device displaces the bearing housing relative to the bearing. According to a first variant, the device is supported (temporarily) on the machine carrier or the rotor unit, i.e. it is connected to the latter, for example via detachable connections, at least during the process of pulling off. Alternatively, the extraction device is only supported on the bearing housing on the one hand and on the bearing on the other hand, and for this purpose is preferably arranged temporarily on the bearing housing and has, for example, stamps that press against the bearing. In particular, the device, in particular at least one stamp, is supported on the rotor unit, for example on the hub or a rotor lock disk. The stamp is in particular a hydraulic stamp.

As mentioned above, a holding device is provided to support the rotor shaft during replacement, i.e. to support the rotor shaft when the support provided by the bearing is no longer present.

This holding device is preferably arranged according to the second independent inventive aspect at least partially in the region between the bearing seat and the front end of the rotor shaft, in particular the rotor hub. In this context, "at least partially" it is understood to mean that the holding device extends over a certain axial length and that a partial region can extend in the axial direction to the level of the bearing seat or beyond the latter. The decisive factor is that at least a front subregion of the holding device is arranged between the bearing seat and the rotor hub and, in particular, also supports the rotor shaft in this front region. At least the absorption of the forces required to support the rotor shaft preferably takes place in the region between the bearing seat and the rotor hub.

The bearing typically has a plurality of add-on parts, such as a seal carrier, a seal cover, a spacer ring, a shaft nut, etc. In a preferred embodiment, at least one and preferably several/all of these add-on parts are axially displaced in the direction of the axis of rotation in a non-destructive manner and are reused after the bearing has been replaced. These parts therefore remain—just like the annular bearing housing—arranged around the rotor shaft during the replacement. The bearing housing as well as the add-on parts are merely shifted axially along the rotor shaft into a rearward region, typically oriented towards the transmission, so that the bearing is accessible.

In order to facilitate the pressing-off or pulling-off of the bearing housing, in an expedient embodiment the bearing housing and/or the used bearing is treated, in particular heat-treated, before the bearing housing is pressed off/pulled off and/or pushed back on, so that a certain relative elongation occurs in the radial direction.

According to a first method variant, the bearing housing is first pressed off/pulled off while the used bearing is still in the bearing seat. According to an alternative design, the used bearing is axially displaced in its entirety together with the bearing housing in a first step before the bearing housing is pressed off/pulled off. In the first variant mentioned, the pressing-off/pulling-off typically takes place against the axial direction, i.e. in the direction from the rotor hub to a transmission. In the second variant, the bearing housing can alternatively be pressed off/pulled off in the forward direction towards the rotor hub. In the second alternative, the bearing housing with the bearing located therein is regularly displaced backwards against the axial direction, so that free space is created at the front.

According to a first preferred variant, the entire new bearing is first arranged and assembled around the rotor shaft for assembling the new bearing. For this purpose, the individual bearing parts (inner ring, outer ring, possibly bearing cage . . . ), which are designed in particular in a segment-like manner, are arranged in particular successively. The bearing housing is then slid over the previously completed new bearing.

According to a preferred second variant method, the new bearing is first only partially assembled around the rotor shaft, so that only a partially assembled bearing is prepared. The bearing housing is then pushed axially onto the partially assembled bearing together with another bearing component. The partially assembled bearing is, for example, an inner ring, possibly with rolling elements (rollers, cones) arranged thereon, which thus fully surround the rotor shaft in a pre-assembled state. The other bearing components are, for example, the outer ring or a part thereof, which is pushed on together with the bearing housing.

For both variants shown, i.e. both for the variant in which the entire bearing is initially assembled and for the variant in which only part of the bearing is initially assembled, the (partially assembled) new bearing is preferably assembled directly on the bearing seat. Alternatively, it is also possible that the new bearing is assembled away from the bearing seat, and then the (partially assembled) bearing is moved into the bearing seat. Finally, it is also possible that the bearing is (partially) assembled at a distance from the bearing seat and then the bearing housing is slid over it and finally the bearing housing is slid into the bearing seat together with the new bearing.

In an expedient embodiment—especially with regard to the second variant described above with the partially assembled bearing—the bearing is designed as a double-row bearing with two rows of rolling elements and the outer ring of the new bearing is divided into a plurality of outer ring parts as viewed in the axial direction. One of said outer ring parts is then preferably slid onto the partially assembled bearing together with the bearing housing.

In a preferred embodiment, a lifting device is provided, by means of which the rotor shaft is lifted in particular relative to the machine carrier. This simplifies disassembly/assembly and in particular pressing-off/pulling-off from bearing or respectively pushing onto the bearing. For example, the rotor shaft is only lifted by a few mm to a few cm at most.

In a preferred embodiment, an old, used sealing system used to seal the bearing is replaced with a different type of sealing system. Especially, for example, a labyrinth sealing system of the old bearing is replaced by a rotor shaft seal ring in the new bearing. This has a smaller footprint compared to a labyrinth sealing system and compensates for a possibly larger build volume of the new bearing. Divided bearings usually have a slightly larger overall volume than non-divided bearings.

With regard to the design of the new bearing and its subdivision into different bearing ring segments, basically different structures known are possible in principle. Preferably, the new bearing is designed according to of EP 3 333 439 A1, as also described in paras [0023] to [0032]. These particular embodiments and these parts of the description are hereby incorporated into the disclosure of the present application.

For example, the exchange procedure is as follows:
1. Fastening crossbeam (holding device) to hold rotor in place.
2. Unscrewing seal carrier, cover and similar from rotor bearing housing.
3. Lifting rotor unit by means of the holding device.
4. Pulling off rotor bearing housing from the bearing and move it in the direction of the transmission.
5. Removing old bearing (especially by a separation method).
6. Depending on whether the seal carriers and lids are to be reused, also removing them or just pulling them off (leaving them in place).
7. Assembling new divided bearing.
8. Sliding housing onto the new bearing and lower rotor unit again.
9. Mounting the divided or old seal carrier and cover.
10. Disassembling holding device.

In the variant with an outer ring divided in the axial direction, for example, an easier assembly sequence is provided with subsequent modified steps 7 and 8:
7. Assembling inner bearing rings and cage with rolling elements on the shaft, assembling transmission-side raceway segments of the outer ring in the housing.
8. Sliding new bearing housing onto the bearing. Assembling rotor-side outer ring part, i.e. the rotor-side raceway segments of the outer ring.

The task is further solved by a bearing arrangement, in particular of a wind power plant, wherein the bearing arrangement comprises a bearing arranged in a bearing housing, in particular the main bearing of the wind power plant, wherein the bearing housing is a used bearing housing and the bearing is a replaced, in particular new, bearing that has not yet been used. The bearing arrangement was thereby created in particular by means of the previously described method.

The special characteristic of this bearing arrangement is to be seen in the fact that a new bearing is combined with an old bearing housing, as achieved by the special method described above. Furthermore, a special characteristic of this bearing arrangement is to be seen in the fact that a divided bearing is combined with a non-divided bearing housing. That means that the bearing is constructed from a plurality of bearing ring segments (both for the inner ring and for the outer ring), each of which complements the other in the circumferential direction to form a circumferential ring. At the same time, the bearing housing is formed in one piece, in particular monolithically. The preferred embodiments mentioned in connection with the method also apply analogously to the bearing arrangement.

The task is further solved by a device as claimed. A particular aspect is to be seen in the special design and/or the special positioning of the holding device for supporting the rotor shaft. The design of the holding device as such is also regarded as an independently inventive concept.

Preferably, a plate is fastened to the rotor shaft in general, and in particular this plate is designed as a rotor lock disc. The holding device is connected to this plate, in particular to the rotor lock disk, and is indirectly connected to the rotor shaft via this plate. The holding device preferably supports the rotor shaft exclusively via an attachment to the rotor lock disc. Such a rotor lock disc is regularly provided and is typically formed as an at least partially annular, preferably annular disc element with bores, which are hereinafter referred to as locking holes.

By means of a rotor lock device, bolts are usually inserted into these bores, so that rotation of the rotor shaft and thus also of the rotor star is prevented. The particular advantage of the method described here is therefore also to be seen in particular in the fact that the rotor shaft is supported via this rotor lock disk. The holding device is preferably fastened via a bolt engaging in the at least one locking hole.

Typically, the rotor lock disk has a plurality of locking holes lying on a circular arc and the holding device is fastened to the rotor lock disk via a plurality of bolts during replacement. The bolts are therefore correspondingly also arranged on a circular arc line.

According to a first embodiment, the holding device preferably has a crossbeam, which runs above the rotor shaft. The multiple bolts are arranged in this beam. The crossbeam usually has at least one and preferably a plurality of through holes. Said through holes are aligned with the corresponding locking holes of the rotor lock disk and therefore also lie on a circular arc line.

In a preferred embodiment, the holding device has, additionally to the crossbeam, two lateral support struts, by means of which the holding device is supported on the machine carrier.

As an alternative to fastening via the crossbeam, the holding device is fastened directly to the rotor unit via the support brackets. In addition to a preferred attachment to the rotor lock disk, an attachment of the holding device to the rotor shaft or hub is also provided as an alternative.

The holding device is only supported on the machine carrier by the support struts in such a way that a relative movement of the holding device relative to the machine carrier is possible, especially for lifting the rotor shaft.

In an expedient further development, an alignment device, in particular a lifting device, is provided by means of which the rotor shaft can be aligned relative to the machine carrier and, in particular, lifted. During replacement, for example, the rotor shaft is lifted in the vertical direction, i.e. perpendicular to the axial direction, by at most a few mm or a few cm (<10 cm, in particular <5 cm) to facilitate assembly/disassembly.

In an expedient embodiment, the alignment device, in particular the lifting mechanism, is effective between the support struts of the holding device and the machine carrier. Preferably, the holding device as a whole can be lifted together with the rotor shaft relative to the machine carrier. For this purpose, the lifting mechanism preferably has an extendable stamp, which is supported on the machine carrier, for example. The stamp can be extended hydraulically or electrically, for example. The lifting mechanism is also directly part of the holding device and fastened to it, for example.

In a preferred embodiment, the holding device is fastened to the rotor unit on the one hand and to the machine carrier on the other hand, so that it can swivel about a swivel axis. The fastening to the machine carrier provides an effective fastening in the axial direction. At the same time, the pivoted fastening enables a rotary or tilting movement of the holding device and thus of the rotor unit, so that the latter can be lifted in the front, hub-side region via the lifting device.

According to a preferred further development, furthermore an axially extending linear guide is provided, to which the bearing housing can be fastened and is also fastened during replacement. The bearing housing is displaced axially along the linear guide. The linear guide has the particular advantage that a precisely fitting displacement of the bearing housing over the new bearing is reliably possible despite the usually small gap dimensions (in the range of a few $^1\!/_{10}$ mm) between bearing and bearing housing.

In a preferred embodiment, the linear guide is fastened to the holding device. It is preferably tilted with the latter about the aforementioned pivot axis when the rotor unit is lifted.

BRIEF DESCRIPTION OF THE FIGURES

An embodiment example is explained in more detail below with reference to the figures. Simplified illustrations show.

DETAILED DESCRIPTION OF THE INVENTION

The figures respectively show a bearing arrangement 2 of a wind turbine not shown in more detail here. The bearing arrangement comprises a bearing 4, in particular the so-called main bearing of such a wind turbine, as well as a bearing housing 5. The bearing arrangement 2 furthermore preferably includes a rotor shaft 6, which is supported by the bearing 4 and can rotate about an axis of rotation 8 du-ring operation. The rotor shaft 6 extends from a rear, transmission-side region in the axial direction 10 to a front, hub-side end of the rotor shaft 6. A rotor hub 12 is fastened to said hub-side end in the operating state, as shown in highly simplified form in FIG. 3.

Figure 3:
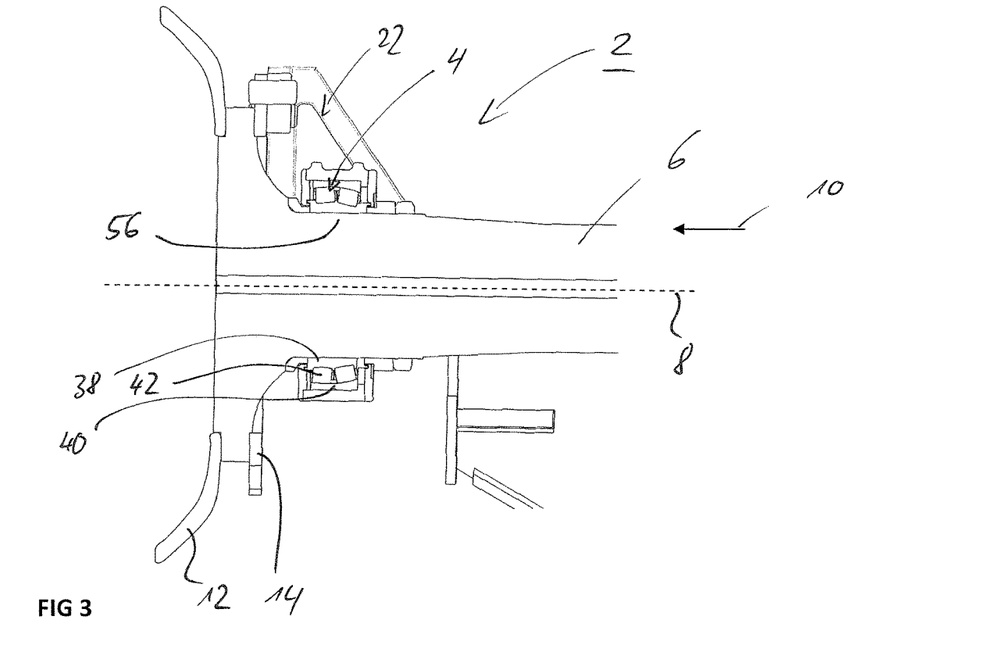
FIG. 3 a sectional cross-sectional view of the bearing arrangement according to FIG. 1

As can be seen in particular, for example, from the cross-sectional view according to FIG. 3, the rotor shaft 6 widens towards its hub-side end to form a type of connecting flange for fastening to the rotor hub 12. Furthermore, a so-called rotor lock disk 14 designed as a ring is fastened to said connecting flange.

In the embodiment example, the bearing 4 is arranged directly adjacent to the hub-side, widening connecting flange of the rotor shaft 6. In the rear region, the rotor shaft 6 in the embodiment example is connected to a transmission 16. In transmissionless embodiments, the rotor shaft 6 is directly connected to a generator or respectively a generator rotor. The entire bearing arrangement 2 as well as the transmission 16 or respectively the generator are thereby arranged on a machine carrier 18. Said machine carrier 18 is generally characterized in that it has two lateral support surfaces 20, between which a free space is formed, into which the transmission 16, but in particular also the bearing arrangement 2, i.e. the bearing 4, the bearing housing 5 and preferably also the rotor shaft 6, is partially immersed. In particular, the machine carrier 18 is approximately half-shell-like at least in the front region where the bearing 4 is located. Both the bearing 4 and the transmission 16 are supported on the support surfaces 20.

Furthermore, a holding device 22 is shown in the figures, by means of which the rotor shaft 6 is supported on the machine carrier 18 during a bearing exchange. For this purpose, the holding device 22 generally has a crossmember 24 extending above the rotor shaft 4 and two lateral support struts 26, which are supported on the supporting surfaces 20 of the machine carrier 18. The two support struts 26 are each preferably formed by an approximately triangular supporting frame in the embodiment example. Furthermore, a lifting device 28 is arranged on the holding device 22, which is designed for lifting the holding device 22 with respect to the supporting surfaces 20. Said lifting device 28 has, for example, electrically or hydraulically operable and extendable stamps or adjusting screws.

Bolts 30 are inserted via through holes in the crossmember 24, and when the bearing 4 is moved to replace it, they engage corresponding locking holes 32 in the rotor lock disk 14.

The bearing 4 is generally arranged in the bearing housing 5. Said bearing housing 5 is an annular element, which fully surrounds the bearing 4 and has two opposing fastening flanges 36, which therefore project radially. Said fastening flanges 36 rest on the support surfaces 20 of the machine carrier 18. The bearing housing 5 is typically fastened to the machine carrier 18 with screws. In the embodiment example, the bearing housing 5 has two spaced-apart circumferential stiffening ribs on the outside.

Figure 4:
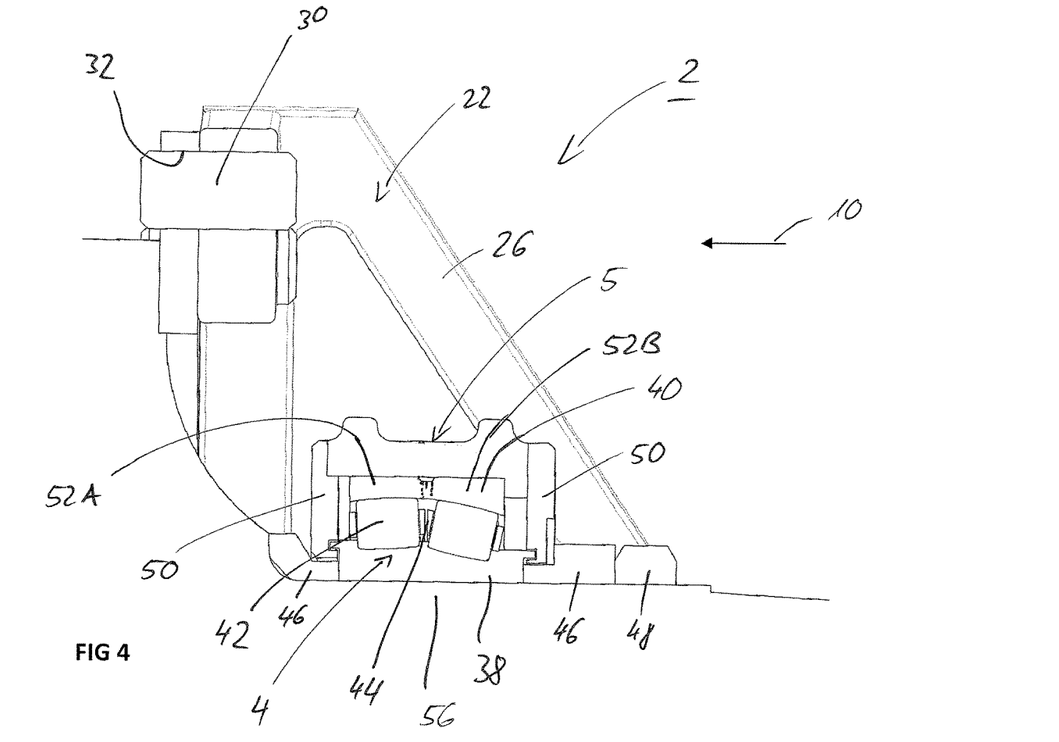
FIG. 4 an enlarged sectional view in the region of the main bearing.

The design of the bearing 4 can be seen in particular from FIGS. 3 to 6. The bearing 4 has an inner ring 38, an outer ring 40 and rolling elements 42 arranged between them. These are typically arranged in a bearing cage 44. In the embodiment example, the bearing 4 is designed as a double-row roller bearing. Furthermore, the bearing arrangement 2 has a spacer ring 46 on each side. In the embodiment example, the hub-side spacer ring 46 is supported on a stop surface of the rotor shaft 6. The transmission-side spacer ring 46 rests against a shaft nut 48. The inner ring 38 is held clamped between the two spacer rings 46. Two lateral, annular housing or seal covers 50 are also associated with the bearing housing 5. In the embodiment example, the inner ring 38 and the outer ring 40 are each non-divided in the axial direction 10. Alternatively, the outer ring 40 is divided in the axial direction into a hub-side outer ring part 52A and a transmission-side outer ring part 52B. In the present case, hub-side is always understood to mean the region facing the rotor hub 12 in the axial direction 10 and transmission-side the opposite region. This alternative design is illustrated in FIG. 4 by a dashed dividing line.

Figure 1:
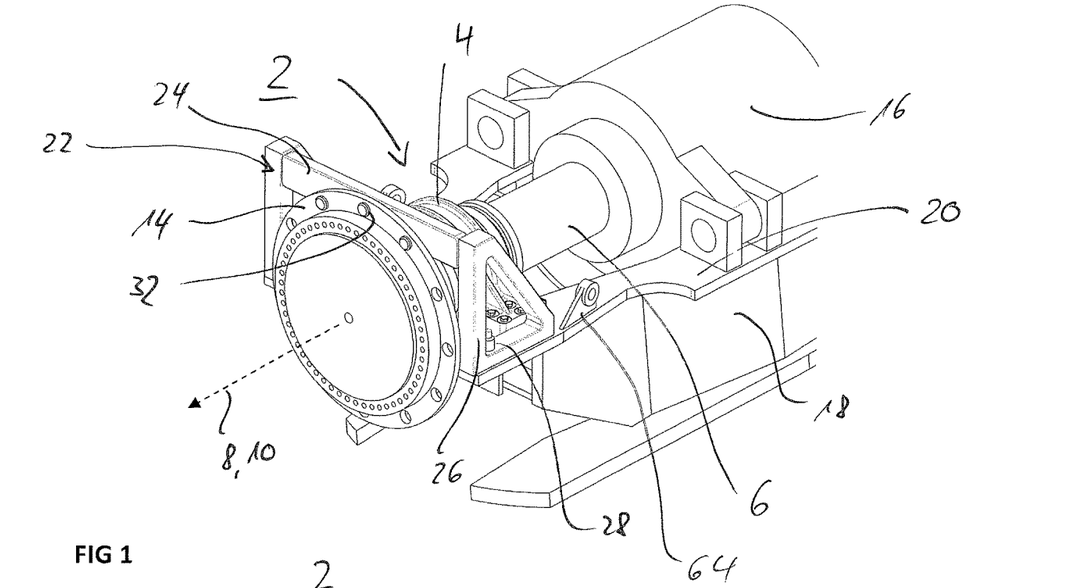
FIG. 1 a first sectional perspective view of a bearing arrangement of a main bearing of a wind turbine on a machine carrier, FIG. 2 a second sectional perspective view of the bearing arrangement according to FIG. 1, looking at the main bearing.
Figure 2:
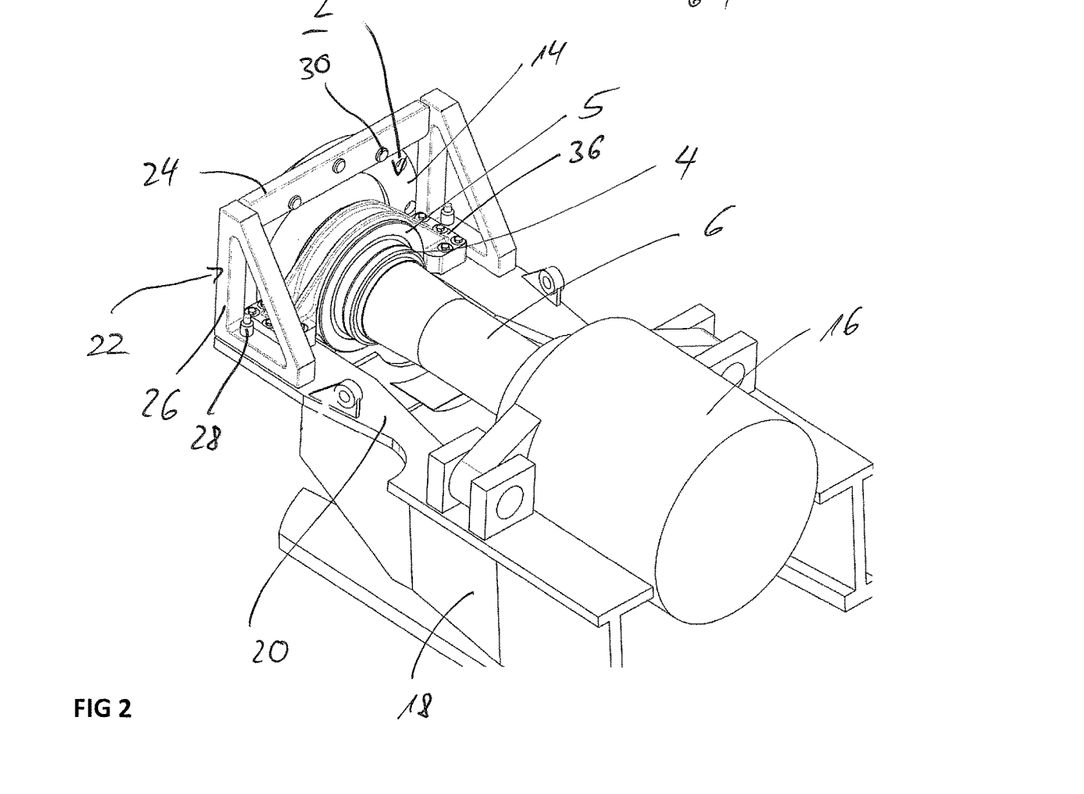

FIGS. 1 and 2 show an initial situation with an old, used bearing 4, in the normal installation situation, in which the bearing housing 5 is fastened to the machine carrier 18 and accommodates the bearing 4, in which the rotor shaft 6 is mounted. Fastened to the hub side of the rotor shaft 6 is a so-called rotor star, which is not shown in more detail here. Said rotor star has the rotor hub 12 and rotor blades fastened to it. The arrangement shown in the figures is generally located in wind turbines at the upper end of a tower within a so-called nacelle, which is typically rotatable about a vertical axis.

The holding device 22 shown is typically arranged and fastened temporarily. In the embodiment example, the holding device 22 is positively or non-positively fastened to the rotor lock disk 14 via the bolts 30 as described. For replacing the bearing 4, it is proceeded as follows:

First, the add-on parts, in particular the shaft nut 48, the transmission-side spacer ring 46 and the transmission-side seal cover 50 are pulled off counter to the axial direction 10 along the rotor shaft 6 to the rear in the direction of the transmission 16. Then the bearing housing 5, which was previously detached from the machine carrier 18, is also pressed off or pulled off from the bearing 4 towards the rear in the opposite direction to the axial direction 10.

Figure 5A:
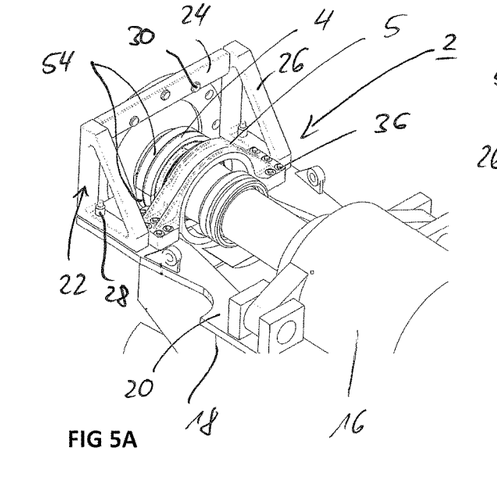
FIG. 5A a first perspective sectional view of the bearing assembly according to FIG. 1, looking at the bearing during replacement of the bearing, FIG. 5B a second perspective sectional view similar to FIG. 5A, but with a linear guide, FIG. 6 a sectional view similar to FIG. 3, during a replacement situation, with a bearing housing removed from the bearing, and FIG. 7 a perspective view similar to FIG. 2 with an alternative variant for the holding device.
Figure 5B:
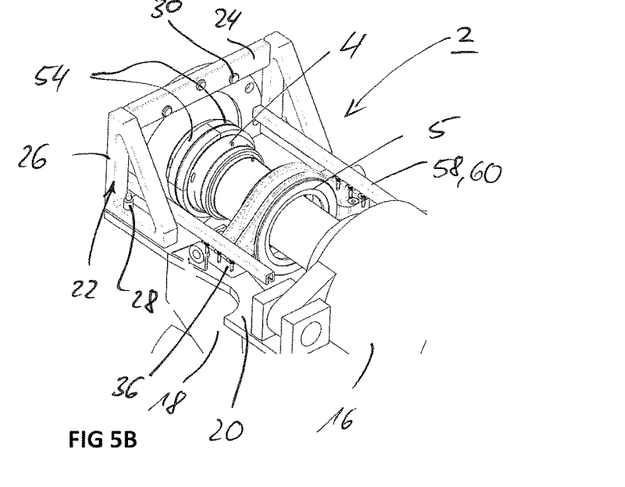

The bearing 4 is then disassembled. If the bearing is a divided bearing, the individual ring segments are separated from each other non-destructively if necessary. In the case of a non-divided bearing, destructive disassembling typically takes place by separating the bearing rings 38, 40 into individual sections, for example by separation welding. The spent bearing parts are removed and then a new bearing 4 is built around the rotor shaft 6. In this case, the new bearing 4 is necessarily designed as a divided bearing 4. Both the inner ring 38 and the outer ring 40 are divided into individual ring segments, each of which is fitted around the axis of rotation 8 and thus around the rotor shaft 6. FIG. 5B shows such a divided bearing with ring segments 54 for the outer ring 40.

In the embodiment shown in FIG. 5B, the new bearing 4 is built up in the region of a bearing seat 56. The bearing seat 56 is defined by the position that the bearing 4 assumes during operation. Especially, the bearing seat 56 is defined by the region between the two spacer rings 46.

In FIG. 5B—as an essential difference to the situation in 5A—a linear guide 58 is additionally illustrated. The linear guide 58 is fastened, in particular temporarily, preferably to the holding device 22, in particular to its support struts 26. Alternatively, the linear guide 58 can also be fastened to the machine carrier 18. The linear guide 58 is designed, for example, in the manner of a rail. Guide elements not shown in more detail here engage in this linear guide 58, which are either part of the bearing housing 5 or are connected to it. Via the linear guide 58, an exact and, as far as possible, tolerance-free displacement of the bearing housing 5 in and against the axial direction 10 is ensured. This is particularly advantageous for mounting, i.e. pushing the bearing housing onto the new bearing 4 due to the small gap dimensions.

To simplify assembly, the rotor shaft 6 is lifted slightly via the lifting device 28 mentioned, for example in the range of a few mm to a few centimeters (for example 1-2 centimeters), so that the bearing housing 5 is load-free overall, i.e. no longer rests under load on the support surfaces 20. For easier assembly/disassembly, the bearing housing 5 is preferably also heated, so that it expands slightly radially.

Figure 6:
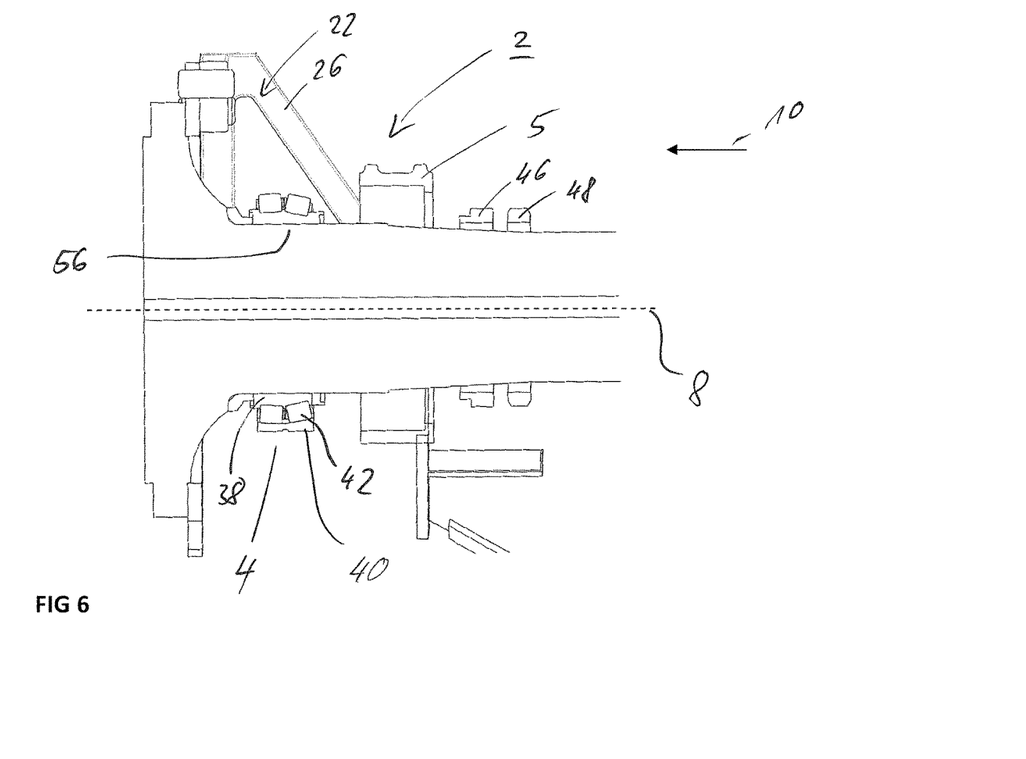

FIG. 6 shows a sectional view through a situation similar to FIG. 5A, in which the bearing housing 5 is pressed off or pulled off backwards against the axial direction 10. In FIG. 6, an annular segment 54 of the outer ring 40 is shown only in the lower half of the picture. In the upper half of the figure, this ring segment 54 is still missing. Starting from the situations shown in FIGS. 5A, 5B and 6, the bearing housing 5 is pushed back onto the assembled bearing 4 in the axial direction 10. The same applies to the add-on parts such as spacer ring 46 and shaft nut 48.

Figure 7:
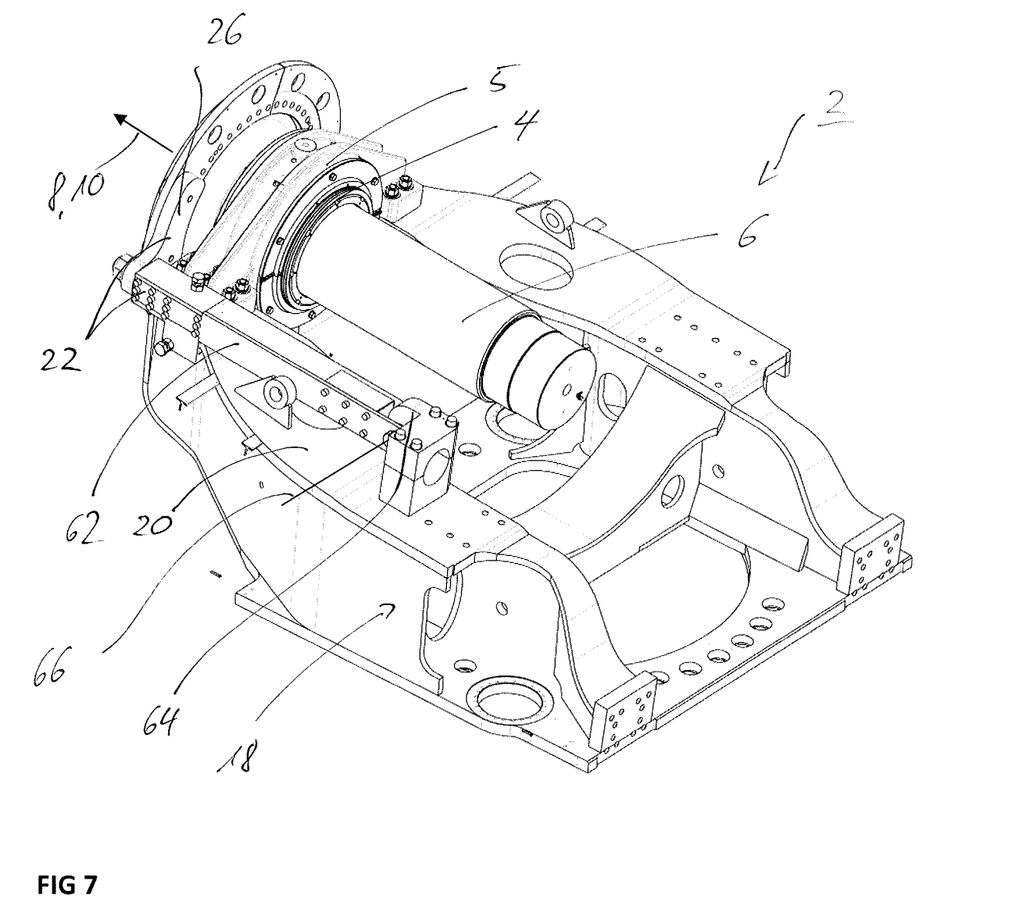

FIG. 7 shows an alternative variant for the holding device 22, in which the support struts 26 are fastened directly to the rotor unit, in particular to the rotor lock disk 14.

A longitudinal member 62 is connected to a respective support strut 26, which is connected to the machine carrier 18 at a pivot or tilt bearing 64. The longitudinal beam 62 can be rotated about a pivot axis 66 defined by the tilt bearing 64. When the rotor unit is lifted in the front region on the hub side, the longitudinal member 62 slightly rotates about the pivot axis 66. The longitudinal member 62 is therefore designed in the manner of a rocker arm. The tilt bearing 64 is preferably located in a rear region on the transmission side, in particular on a transmission support, i.e. on a support structure, by means of which the transmission 16 (not shown in FIG. 7) is supported on the machine carrier 18.

In FIG. 7, a support strut 26 and the longitudinal member 62 are shown on one side only. Preferably, a support strut 26 and a longitudinal member 62 are arranged on both sides.

Also in the embodiment according to FIGS. 2 to 6, the holding device 22 is preferably connected to the machine carrier 18 via a tilt bearing 64. Conversely, also in the embodiment according to FIG. 7, the lifting device 28 and preferably also the linear guide 58 are provided.

The axial displacement of the bearing housing 5 relative to the used bearing 4 is carried out by means of an auxiliary device not shown in more detail here, in particular by means of a pushing-off device. Said pushing-off device has one or more (hydraulic) stamps, which are supported on the rotor unit on the one hand and on the bearing housing on the other.

The replacement concept presented here is preferably used for three-point bearing arrangements as well as four-point bearing arrangements of wind turbines. However, the replacement concept described here is not limited to such applications.

The starting point of the replacement concept is, on the one hand, that the bearing 4 is replaced without disassembling the rotor shaft 6 and, on the other hand, that the bearing housing 5 is only pushed off/pulled off axially and then pushed back onto the new bearing 4. The bearing housing 5 is in particular a one-piece, monolithic component, which is therefore not divided into individual housing halves or ring segments.

| List of reference signs | |
|---|---|
| 2 | bearing arrangement |
| 4 | bearing |
| 5 | bearing housing |
| 6 | rotor shaft |
| 8 | axis of rotation |
| 10 | axial direction |
| 12 | rotor hub |
| 14 | rotor lock disk |
| 16 | transmission |
| 18 | machine carrier |
| 20 | support surfaces |
| 22 | holding device |
| 24 | crossmember |
| 26 | support struts |
| 28 | lifting device |
| 30 | bolts |
| 32 | locking holes |
| 36 | fastening flanges |
| 38 | inner ring |
| 40 | outer ring |
| 42 | rolling elements |
| 44 | bearing cage |
| 46 | spacer ring |
| 48 | shaft nut |
| 50 | sealing cover |
| 52A | hub-side outer ring part |
| 52B | transmission-side outer ring part |
| 54 | ring segments |
| 56 | bearing seat |
| 58 | linear guide |
| 60 | |
| 62 | longitudinal member |
| 64 | tilt bearing |
| 66 | pivot axis |

The invention claimed is:

1. A method for replacing a used bearing, wherein the used bearing is arranged during operation at a bearing seat and supports a rotor shaft extending along an axis of rotation and in an axial direction towards a rotor hub as part of a rotor unit, the used bearing is arranged in a bearing housing designed as a one-piece, non-divided bearing housing and is fastened to a machine carrier; the method comprises: without disassembly of the rotor shaft,
removing the bearing housing from the used bearing by axial displacement by pulling or pressing the bearing housing off the used bearing in the direction of the axis of rotation, wherein the bearing housing remains arranged around the rotor shaft;
dividing the used bearing, and removing the used bearing from the rotor shaft;
mounting a new bearing around the rotor shaft, the new bearing having an inner ring, an outer ring, and rolling elements arranged therebetween; and
arranging the new bearing in the bearing housing after removing the used bearing from the rotor shaft;
wherein a labyrinth seal system of the used bearing is replaced by a rotor shaft seal ring in the new bearing, which has a smaller footprint compared to the labyrinth seal system.

2. The method according to claim 1, wherein, during the removing step, the bearing housing is axially displaced by an auxiliary device which is a press off or pull off device, and
the device is supported on a machine carrier or the rotor unit and is connected to the latter via detachable connections and wherein the device comprise at least one stamp, or
the device is only supported on the bearing housing on the one hand and on the bearing on the other hand, and for this purpose is arranged temporarily on the bearing housing, the device having stamps that press against the bearing.

3. The method according to claim 1, the method further comprising supporting the rotor shaft with a holding device arranged on a side of the bearing seat opposite the rotor unit in the axial direction.

4. The method according to claim 1, wherein the used bearing has a plurality of add-on parts selected from the group consisting of a seal cover, a seal carrier, a spacer ring, and a shaft nut, and the method further comprising axially displacing at least one add-on part in a non-destructive manner, wherein the at least one add-on part remains arranged around the rotor shaft, and reusing the add-on part with the new bearing.

5. The method according to claim 1, the method further comprising heat treating the bearing housing to facilitate the removing and/or the arranging step.

6. The method according to claim 1, wherein the bearing housing is removed from the used bearing while the used bearing is in the bearing seat.

7. The method according to claim 1, the method further comprising displacing the used bearing together with the bearing housing along the axis of rotation before removing the bearing housing from the used bearing.

8. The method according to claim 1, further comprising:
mounting the new bearing at least partially around the rotor shaft as a partially assembled bearing; and
pushing the bearing housing together with remaining bearing components, that complete the partially assembled bearing, onto the partially assembled bearing in the axial direction.

9. The method according to claim 1, wherein the new bearing is a double row bearing having two rows of rolling elements and an outer ring of the new bearing is divided in the axial direction into a plurality of outer ring parts, the method further comprising partially assembling the new bearing, and sliding one of the outer ring parts onto the partially assembled bearing together with the bearing housing.

10. The method according to claim 8, wherein the outer ring has a hub-side outer ring part and, opposite thereto, a transmission-side outer ring part, the method further comprising pushing the transmission-side outer ring part with the bearing housing onto the partially assembled bearing before assembling a hub-side outer ring part.

11. The method according to claim 1, the method further comprising providing a lifting device and lifting the rotor shaft during bearing replacement.

12. The method according to claim 1, wherein the used bearing is a main bearing of a wind power plant.

* * * * *

UNITED STATES PATENT AND TRADEMARK OFFICE
CERTIFICATE OF CORRECTION

| | |
|---|---|
| PATENT NO. | : 11,933,362 B2 |
| APPLICATION NO. | : 17/433056 |
| DATED | : March 19, 2024 |
| INVENTOR(S) | : Michael Purucker |

Page 1 of 1

It is certified that error appears in the above-identified patent and that said Letters Patent is hereby corrected as shown below:

On the Title Page

The Assignee should read as follows:
(73) Assignee: Eolotec GmbH, Nuremberg (DE)

Signed and Sealed this
Twenty-second Day of April, 2025

Coke Morgan Stewart
*Acting Director of the United States Patent and Trademark Office*